INVENTOR
HUMPHREYS MILLIKEN
Attorneys

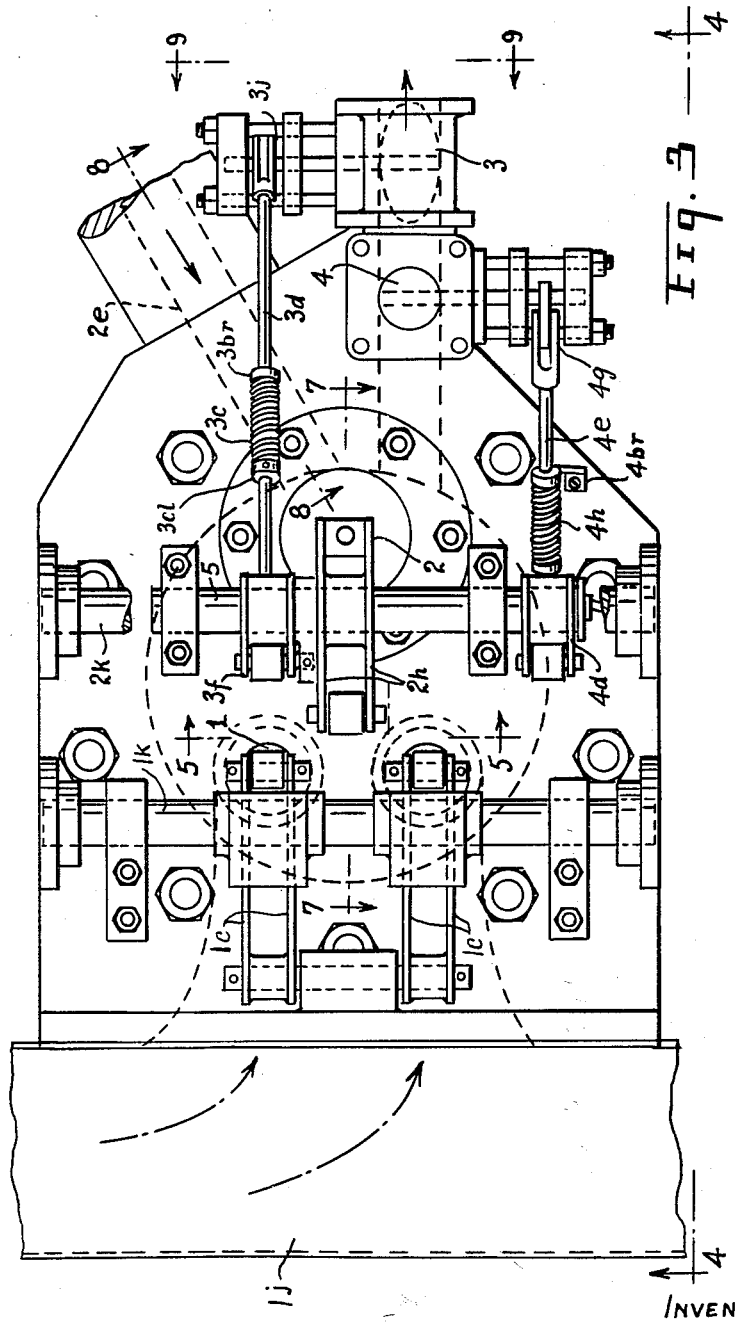

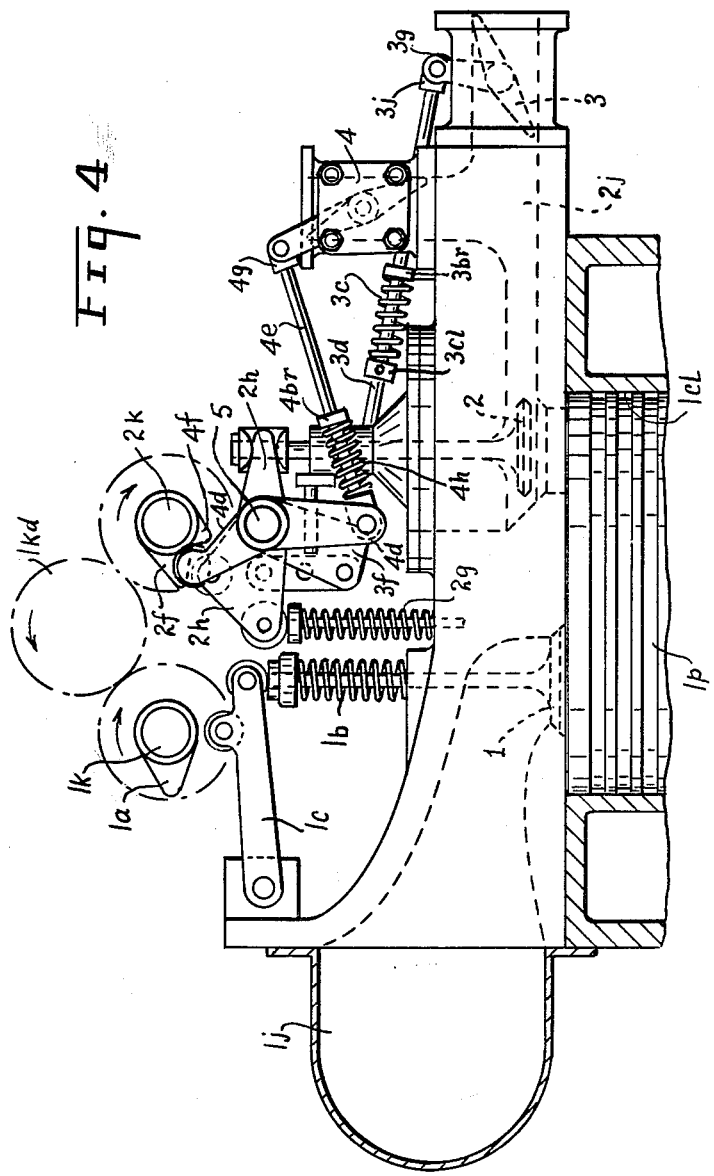

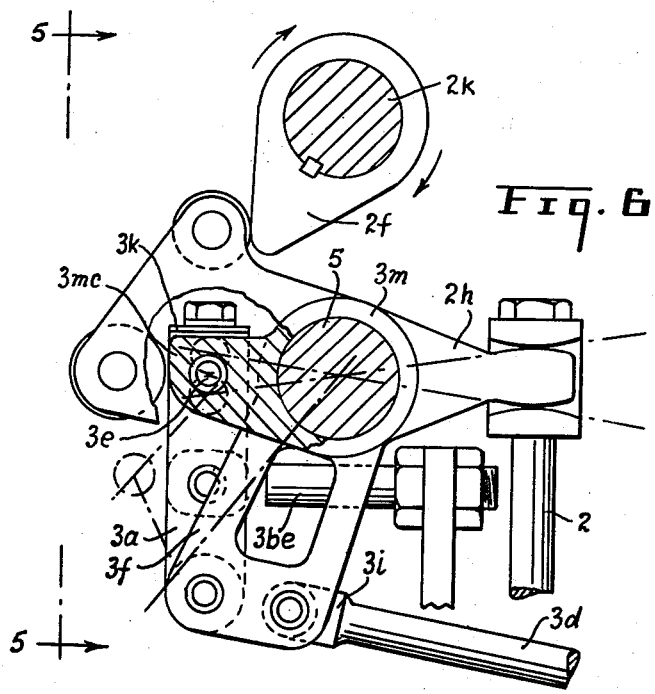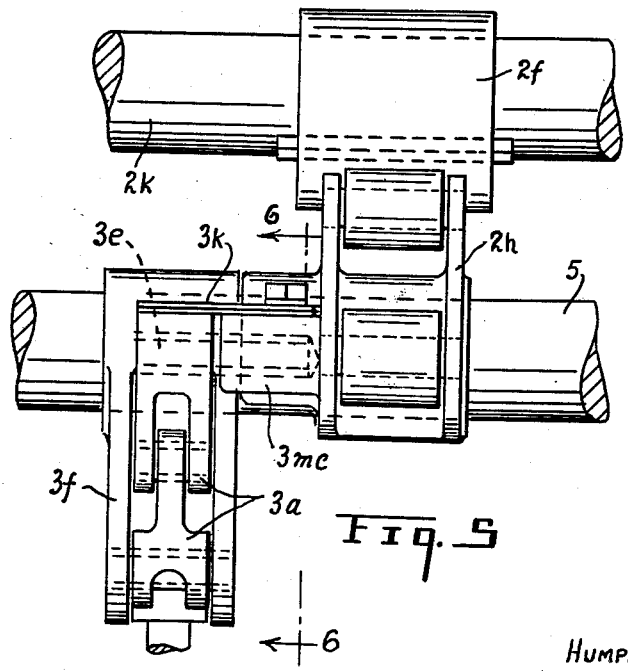

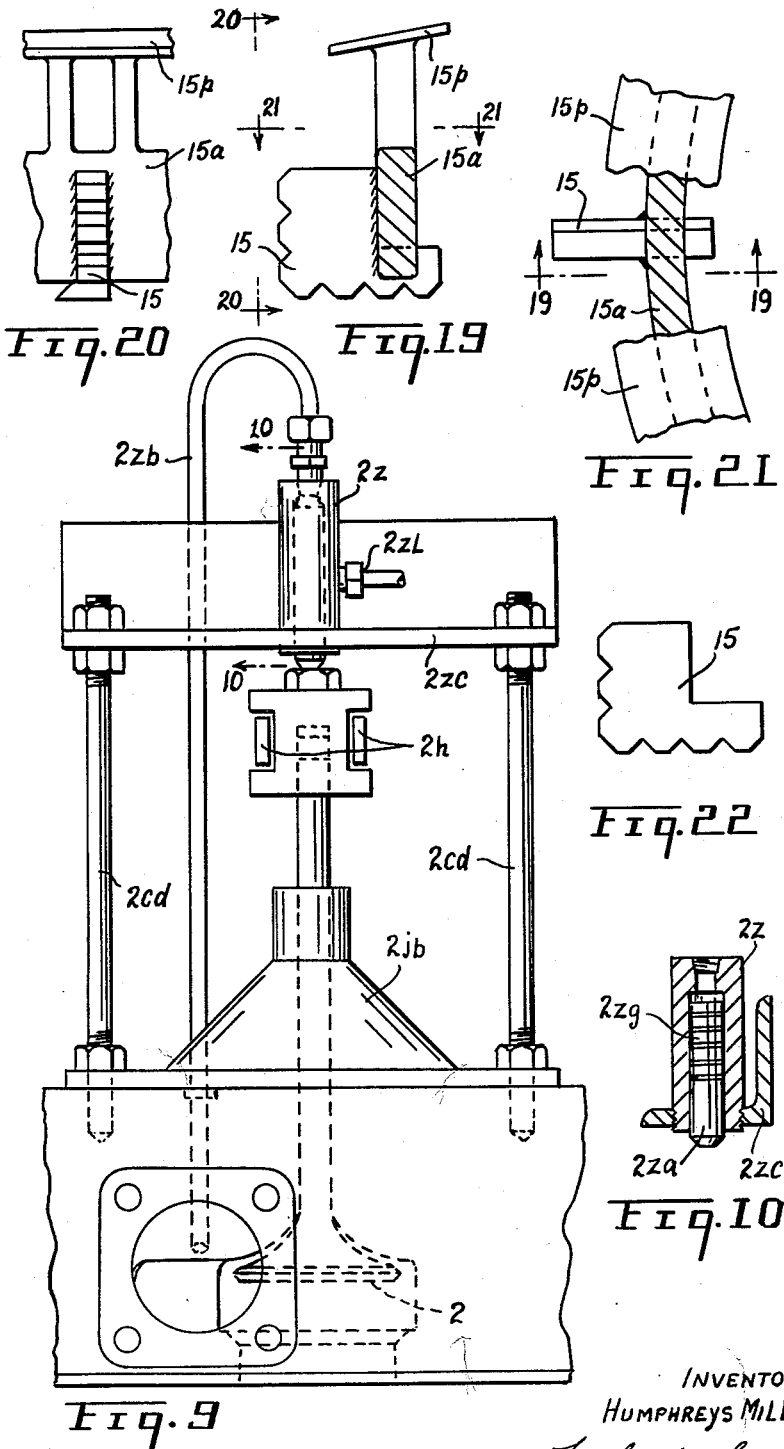

March 2, 1965  H. MILLIKEN  3,171,253
COMBUSTION PRODUCTS ENGINE
Filed May 7, 1963  14 Sheets-Sheet 8

INVENTOR
HUMPHREYS MILLIKEN
Fetherstonhaugh & Co.
Attorneys

INVENTOR
HUMPHREYS MILLIKEN

Fetherstonhaugh Co
Attorneys

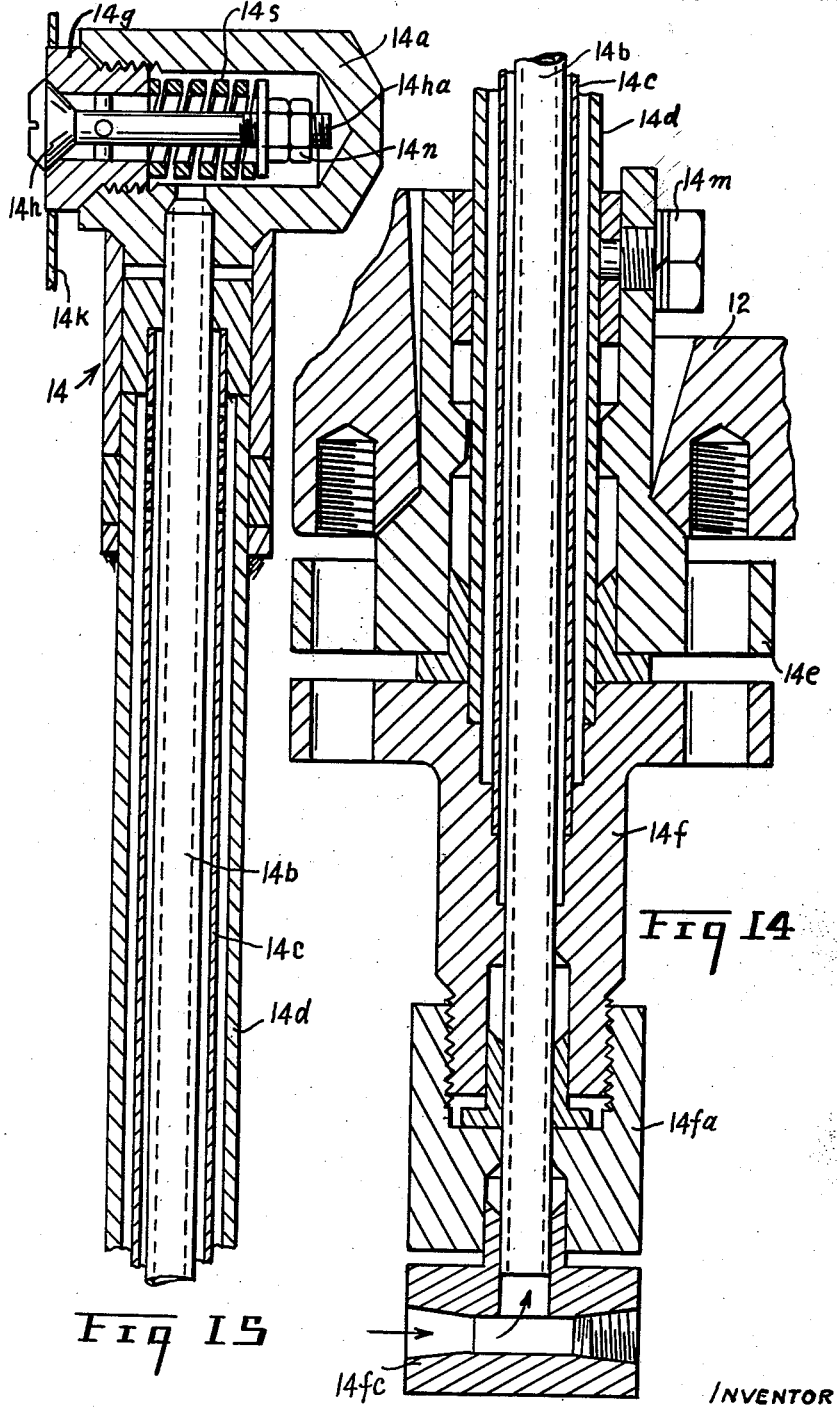

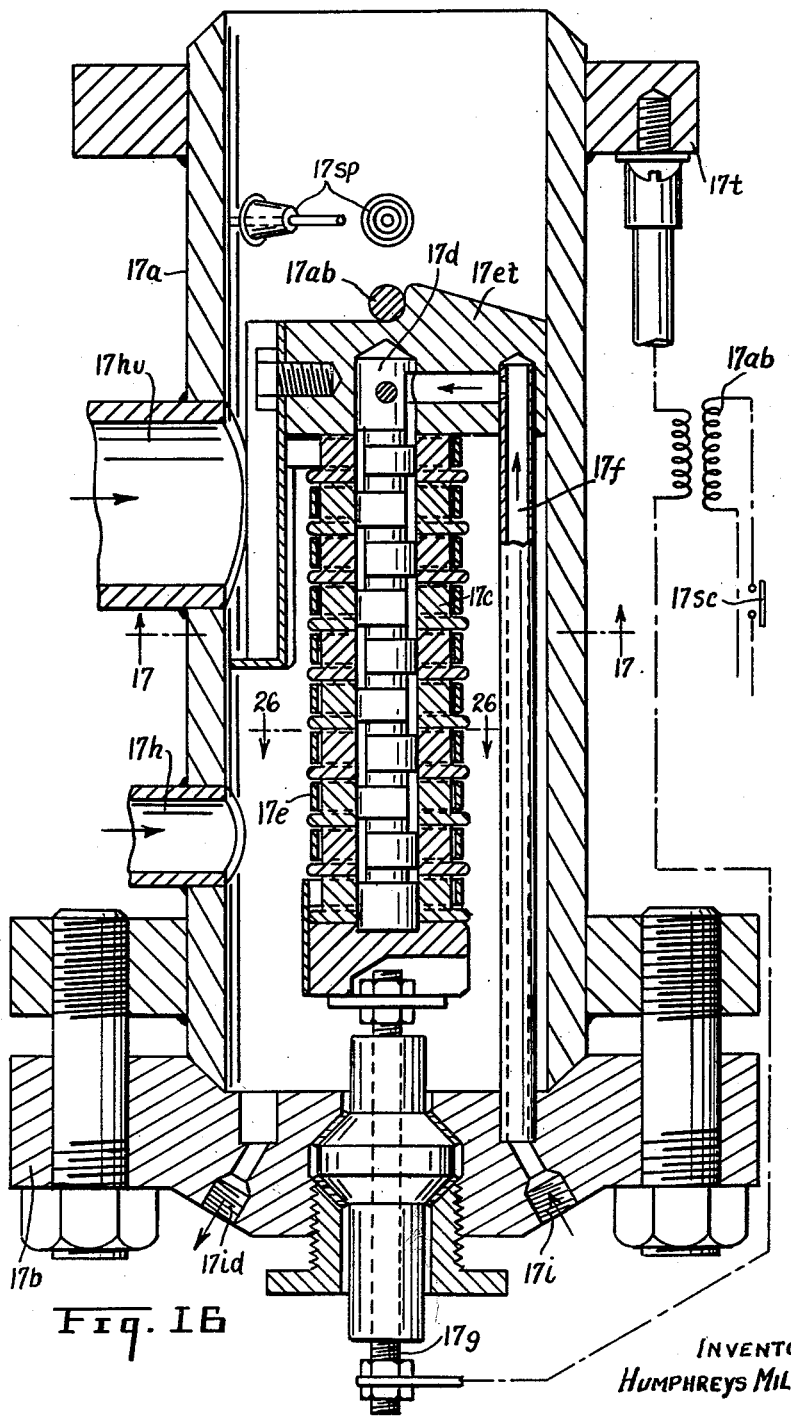

March 2, 1965             H. MILLIKEN             3,171,253
COMBUSTION PRODUCTS ENGINE
Filed May 7, 1963                                                14 Sheets—Sheet 12
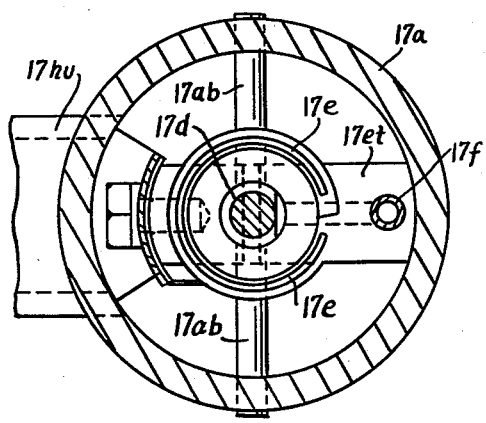
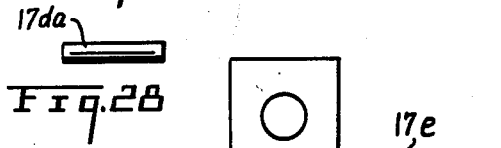
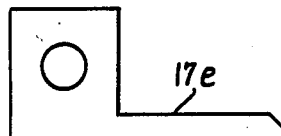
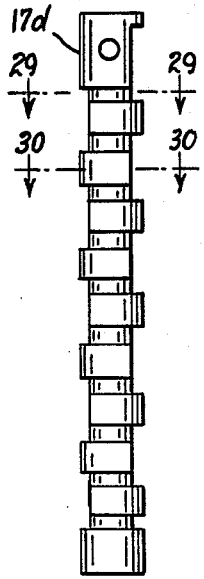
INVENTOR
HUMPHREYS MILLIKEN
Fetherstonhaugh & Co.
Attorneys

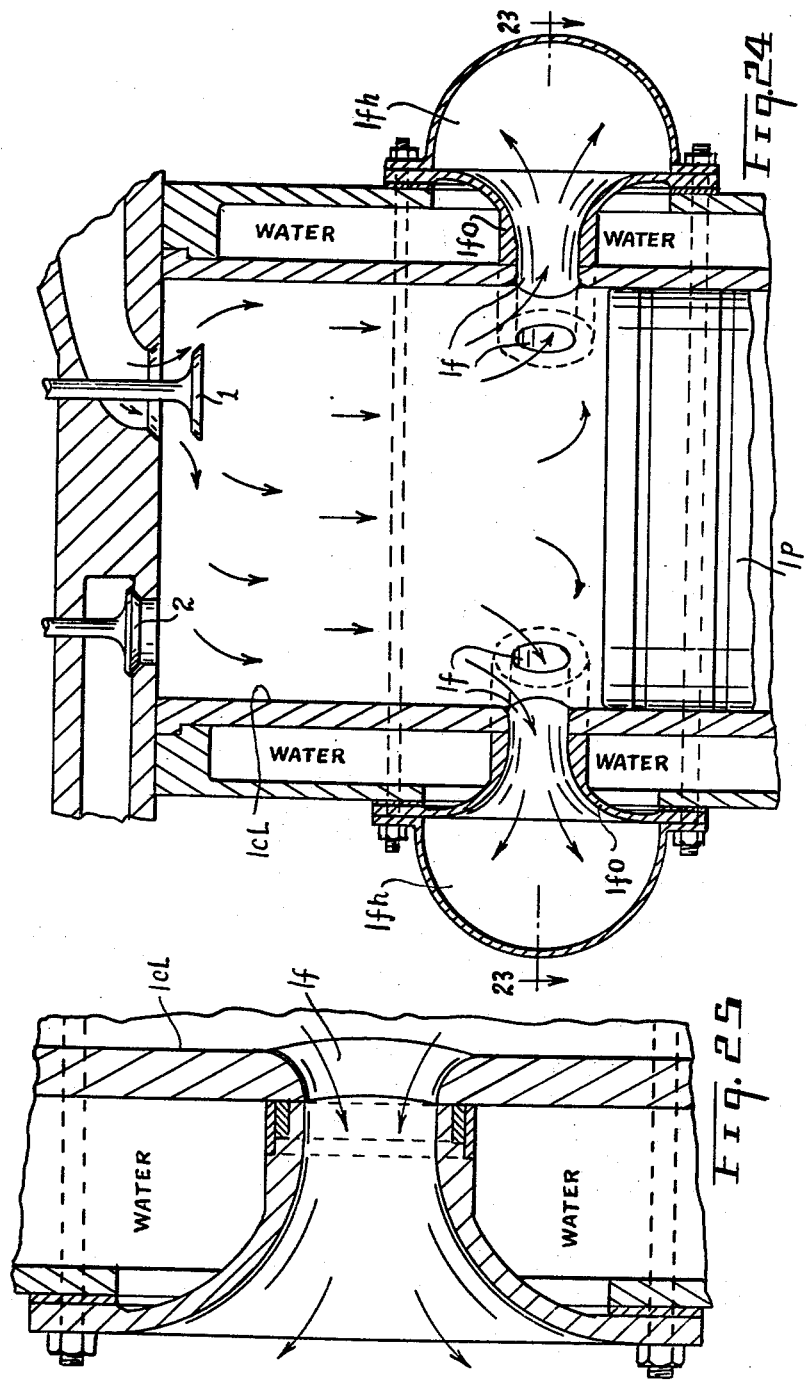

United States Patent Office
3,171,253
Patented Mar. 2, 1965

3,171,253
COMBUSTION PRODUCTS ENGINE
Humphreys Milliken, 211 Stanstead Ave., Mount Royal,
Montreal, Quebec, Canada
Filed May 7, 1963, Ser. No. 278,563
4 Claims. (Cl. 60—39.63)

This invention relates to combustion products engines. Its main purposes are as follows. To provide improved means for the combustion of fuel oil, including greater space and time for completing the process of combustion, viz: vaporizing the liquid fuel, more complete mixing of the vapor with the air and more complete combustion of the mixture.

A further purpose is to provide means for operating on fuel oil of the lowest price, viz: the residual grades containing substantial percentage of incombustible solid ash, with means for seperating the ash from the vapor thus preventing its entry into the engine cylinders with injurious effects and increased cost of maintenance.

A further purpose is to provide means for utilizing the combustion products at maximum temperature and thermal efficiency without overheating the valves or other parts of the engine.

A further purpose is improvement in the means for scavenging the spent combustion products from the cylinders in two-stroke cycle operation, with resulting maximum power output.

A further purpose is to reduce the maximum pressure on the pistons and bearings thereby reducing wear and maintenance cost.

The invention hereinafter described embodies improvements over the construction shown in my U.S. Patent No. 2,977,759, April 4, 1961, said improvements being shown by drawings hereinafter described.

The foregoing and other purposes of the invention will be apparent from the following specification and drawings, in which:

FIG. 3 is a plan view of one of the cylinder-heads using the valve arrangement shown in FIG. 1. In this view the beam 2zc and tube 2zb of FIG. 9 are omitted to avoid confusion.

FIG. 4 is a vertical end elevation on line 4—4 of one cylinder-head of the engine corresponding to FIG. 3, showing cylinder block in cross section and piston in elevation.

FIG. 5 is a vertical elevation on line 5—5 of FIG. 6.

FIG. 6 is a vertical cross section on line 6—6 of FIG. 5.

Figure 8:
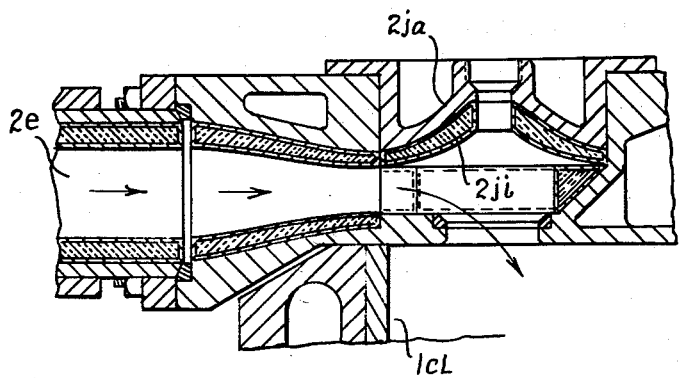

FIG. 8 is a vertical cross section on line 8—8 of FIG. 3, showing only the conduit 2e and valve chamber 2j.

FIG. 9 is a vertical elevation on line 9—9 of FIG. 3, showing a pneumatic device for counter-balancing the outward thrust on the valve-stem which would oppose and delay reclosing the valve.

FIG. 10 is a vertical cross section on line 10—10 of FIG. 9. In this view the operating mechanism of valves 3 and 4 are omitted to avoid confusion.

Figure 11:
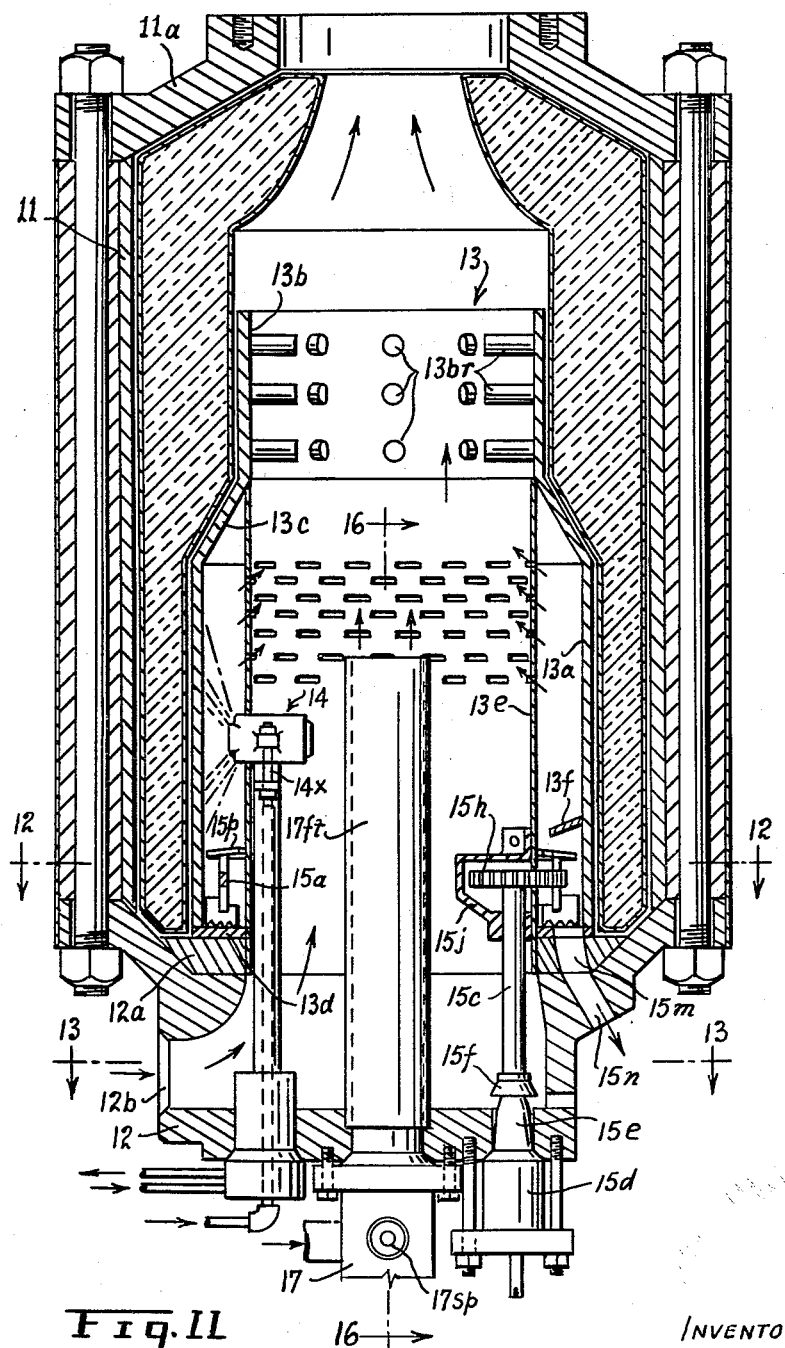

FIG. 11 is a vertical cross sectional elevation on the axis of the external combustor showing the air inlets from the engine, the fuel oil injectors and other details.

Figure 12:
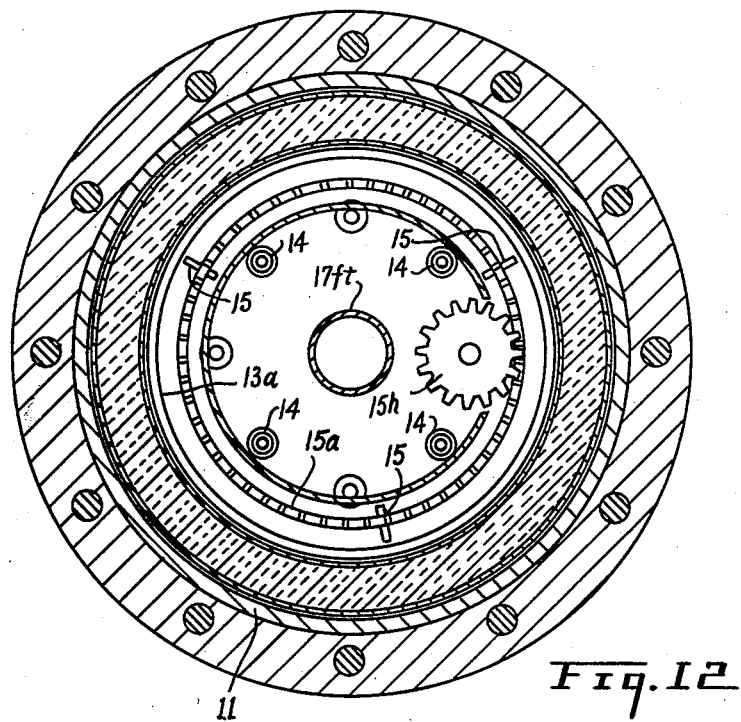

FIG. 12 is a horizontal cross section on line 12—12 of FIG. 11.

Figure 13:
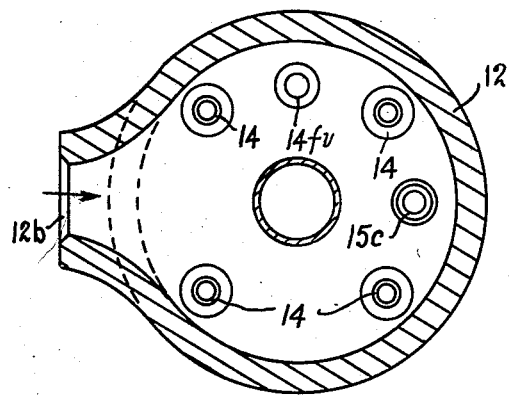

FIG. 13 is a horizontal cross section on line 13—13 of FIG. 11.

FIGS. 14 and 15 are vertical cross sections on the axis of one of the fuel injectors shown in FIGS. 11, 12 and 13.

FIG. 16 is a vertical cross section on the axis 16—16 of the preheater the upper portion of which is shown at the lower end of the combustor in FIG. 11, FIG. 16 being on larger scale than FIG. 11.

FIG. 17 is a horizontal cross section on line 17—17 of FIG. 16 on same scale, as FIG. 16.

FIG. 18 is a flat view of the "Inconel" sheet metal electric heating element, before the sheet metal has been rolled into cylindrical form shown in FIGS. 16 and 17.

FIGS. 19, 20, 21 show the ash scraper blades and associated parts.

FIG. 19 shows a sectional elevation on line 19—19 of FIG. 21, being a cross section through ash scraper ring gear to which the three scraper blades are welded as shown.

FIG. 20 is an elevation view on line 20—20 of FIG. 19 showing one blade welded to the ring gear.

FIG. 21 is a plan view of a portion of the circular ring gear with a cross section of a portion of the ring on line 21—21 of FIG. 19.

FIG. 22 is an elevation of one of the scraper blades.

Figure 23:
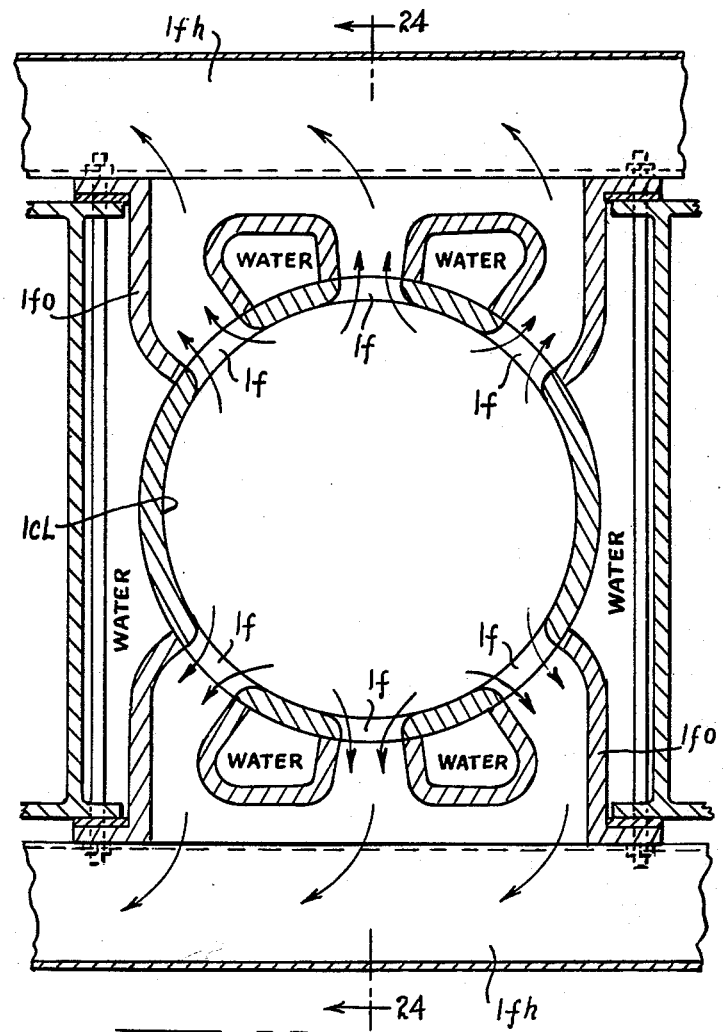

FIG. 23 is a horizontal cross section on line 23—23 of FIG. 24, showing exhaust ports through the cylinder-liner of two-cycle combustion products engine, said liner having uniform thickness at all points, the same thickness between the adjacent exhaust ports as elsewhere, the entire outer surface of the cylinder-liner being in direct contact with the cooling water.

FIG. 24 is a vertical cross section on the axis of the cylinder, line 24—24 of FIG. 23, showing the exhaust ports through the cylinder-liner, the three exhaust ports on each side of the cylinder, the paths of the exhaust gases through the cylinder, through the exhaust ports, through the expanding orifice on each side of the cylinder into the exhaust header.

FIG. 25 is an enlarged view of the exhaust port shown in FIG. 24, in detail.

FIG. 26 is a cross section on line 26—26 of FIG. 16 showing only the fuel-vaporizing structure comprising the distributor rod 17d enclosed by the diffuser rings 17c fitting closely around 17d and the electric heating element 17e fitting loosely around 17c.

FIG. 27 is an elevation view of the fuel distributor rod 17d.

FIG. 28 is a view of metal pin 17da which is driven through the closely fitting hole in 17d and block 17et holding 17d tightly in block 17et as shown in FIG. 16.

FIG. 29 shows a cross section through rod 17d on line 29—29 of FIG. 27.

FIG. 30 shows a cross section through the rod 17d on line 30—30 of FIG. 27.

Figure 1:
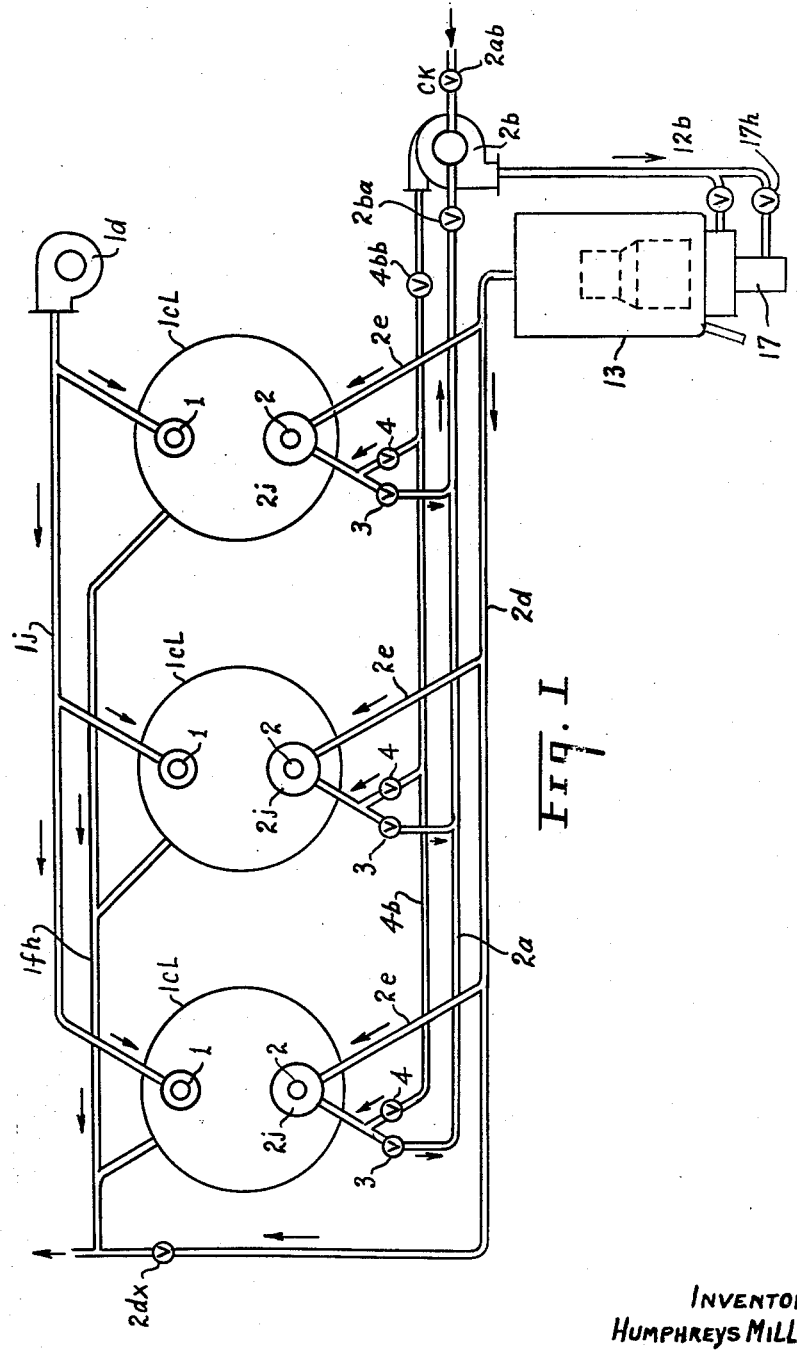
FIG. 1 is a schematic diagram of the engine having a plurality of cylinders served by one combustor and showing the piping, blowers and valves controlling the flow of compressed air from the engine to the combustor and the flow of the combustion products from the combustor to the engine.

The preferred general arrangement and principle of the engine and its accessories are those shown in FIG. 1. The structures shown in FIGS. 2 to 30 refer to FIG. 1.

Figure 2:
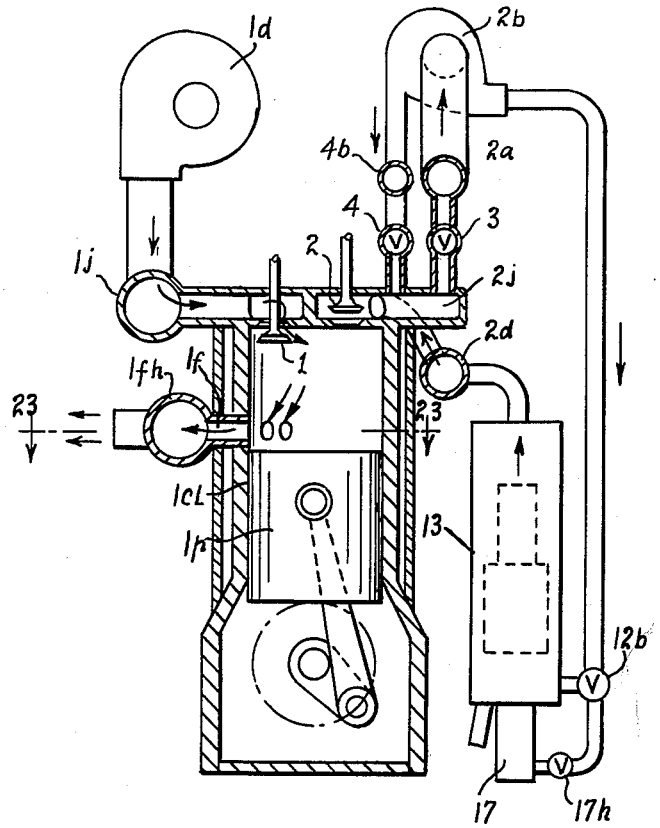
FIG. 2 is a cross section through one cylinder of the engine with the combustor and accessories shown in diagrammatic form as in FIG. 1.

Referring to FIGS. 1 and 2 the general principle of the engine is as follows:

In FIG. 2 the piston 1p is shown in the position it occupies just after the completion of its power stroke which is downward. The piston 1p has just uncovered the exhaust ports 1f through the wall of the cylinder 1cL and the combustion products, having expanded with reducing pressure, to a relatively low value, blow through the exhaust ports 1f to atmosphere through the exhaust header 1fh: the pressure of the combustion products then remaining in the cylinder has dropped to practical atmospheric pressure. Valve 1 has just opened admitting cool fresh air at approximately 4 p.s.i.g. pressure into the cylinder, scavenging out the remainder of the combustion products, leaving the cylinder 1cL filled with cool fresh air. As the piston 1p recloses the exhaust ports 1f in its upward stroke, the pressure of the fresh air in the cylinder is slightly above atmospheric; then valve 1 closes and the piston starts compressing the air, valves 1 and 2 being in closed position. When the pressure in the cylinder 1cL slightly exceeds that in the valve-chamber 2j, on the top side of valve 2, the valve 2 is opened by the differential pressure, and the piston pushes practically all of the compressed air out of the cylinder, there being no "clearance volume" such as that in an internal combustion engine; there remains in the cylinder 1cL only a very small volume of compressed air due to the small mechanical clearance such as one-sixteenth inch, to prevent striking of piston-head against cylinder-head. The compressed air flows through valve 2 and valve-chamber 2j into header 2a, drawn by the circulating blower 2b which circulates the compressed air through the combustor 13; in which its absolute temperature and volume are approximately doubled (at the same pressure) by the combustion of the fuel oil. The increased volume of compressed air, with combustion products, is returned through manifold 2d and inlets 2e, to the valve-chambers 2j, through valves 2, into the engine cylinders, driving the pistons down in their power strokes.

In each cylinder, at the completion of the compression by the piston, valve 2 is first opened by the compressed air in the cylinder, then it is held open by the cam 2f as the top-center position is passed. Valve 2 is held open admitting combustion products into the cylinder, driving the piston downward in its power stroke. The admission period is ended by the closing of valve 2 by its spring 2g acting on rocker 2h, after the piston has travelled approximately fourteen percent of its power stroke; in the closing motion of valve 2, the spring 2g is assisted by the pneumatic force exerted on the valve stem, as shown in FIG. 9, which counter-balances the outward thrust on the valve-stem by the air pressure in valve-chamber 2j, which would otherwise oppose the quick reclosing of the valve 2 at the end of the admission period.

After the admission period is ended by the closing of valve 2, the power stroke continues by the expansion of the combustion products, with reducing pressure until the exhaust ports 1f are uncovered by the piston and the combustion products at atmospheric pressure are exhausted to atmosphere, thus completing the cycle of operation.

The function of valves 3 and 4 is to prevent the mixing of the combustion products ($CO_2$ and $H_2O$) with the fresh compressed air pumped into header 2a by the pistons, thence into the burner in the combustor, which mixing would reduce the efficiency of combustion. Valve 3 remains closed until valve 2 begins opening and the piston 1p starts pushing the compressed air out of the cylinder; then valve 3 opens, permitting flow of the compressed air into manifold 2a. When the piston is very close to top-center position and the flow of compressed air out of the cylinder has practically ceased, valve 3 closes, preventing combustion products from being drawn into manifold 2a through valve-chamber 2j from combustion products inlet 2e and manifold 2d.

Manifold 4b connected to the pressure casing of centrifugal blower 2b receives compressed air at a pressure approximately one pound higher than the pressure in manifold 2d. When valve 2 closes, ending the flow of combustion products into the cylinder, valve-chamber 2j is left filled with combustion products. When valve 2 closes, valve 4 opens admitting a momentary flow of fresh compressed air from manifold 4b through valve-chamber 2j purging the combustion products out of 2j, pushing it back into inlet 2e. The timing and duration of open position of valve 4 is adjustable so as to close when it has pushed only the volume of valve-chamber 2j back into inlet 2e which is larger than the volume of 2j; thus fresh compressed air is not pushed into combustion products manifold 2d. Thus, the closing of valve 4 leaves 2j filled with fresh compressed air, which is pushed into manifold 2a at the next opening of valves 2 and 3.

Referring to FIGS. 3 and 4 showing the valve gear, there are two cam shafts, 1k and 2k driven by spur gears as shown. The three gears shown have helical teeth. Each of the two cam shafts 1k and 2k is adjustable longitudinally in its journals, while running, thereby permitting the adjustment of the timing of the valve gear in relation to the engine crankshaft and pistons. Such adjustment of the camshafts, independently, facilitates tuning of the valvegear for best performance. The two camshafts 1k and 2k are driven by a spurgear 1kd as shown, which in turn, is driven from the engine crankshaft by any suitable mechanical drive, preferably a vertical shaft with bevel gears at each end. As the engine operates preferably on a two-stroke cycle, the camshafts turn at the speed of the crankshaft.

Each cylinder 1cL has two identical air inlet valves (1) opened and closed simultaneously. The two valves are provided in order to insure ample air inlet capacity to thoroughly scavenge the cylinder, each of the valves (1) is opened by its cam 1a and closed by its spring 1b and rocker 1c. The timing of valves 1 in relation to the piston is hereinbefore described in reference to FIGS. 3 and 4.

Figure 7:
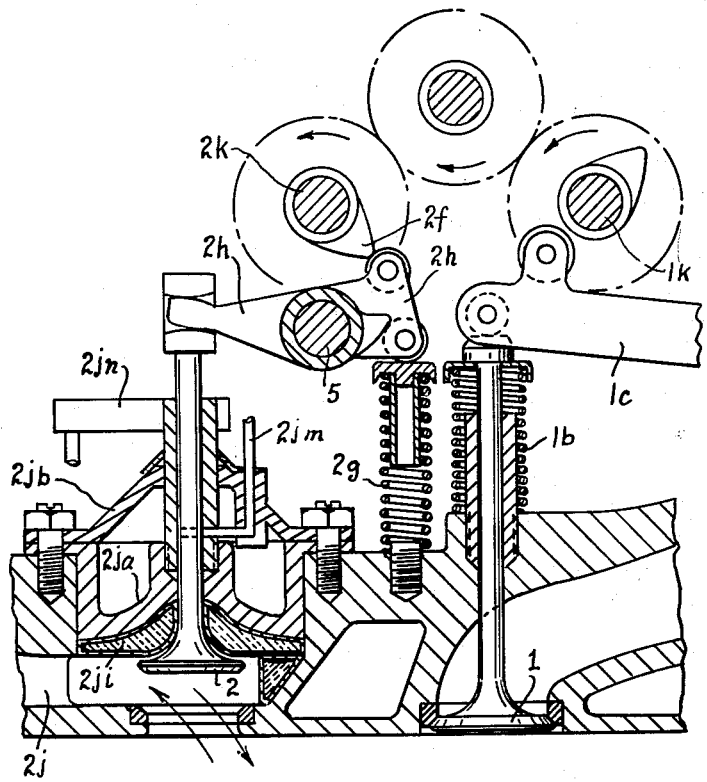
FIG. 7 is a vertical cross section on line 7—7 of the lower portion of FIG. 3, the upper portion being in elevation, FIG. 7 being opposite-hand to FIGS. 3 and 4.

Each cylinder 1cL has one reverse-flow valve 2 which may also be termed a two-way valve opened by its cam 2f (and the air pressure in the cylinder) and closed by its spring 2g, rocker 2h as shown in FIG. 7 (assisted by pneumatic piston 2zg, FIGS. 9 and 10). The stem of valve 2 moves in a guide secured in the roof of valve-chamber 2j, having a conical cover 2jb. The space between 2ja and 2jb is filled with cooling water circulated in and out by conventional means. Lubricating oil is pumped into the valvestem through tube 2jm, flowing upward and out into a pan 2jn at atmospheric pressure from which the oil is drained back to the source and cooled. The inlet pressure of the lubricating oil is substantially lower than the pressure of the air in valve-chamber 2j, to insure flow of the oil upward and not downward. Thus the valvestem is cooled by the lubricating oil.

Valve-chamber 2j is lined with heat insulation 2ji enclosed in "Inconel" sheet metal, a nickel alloy suitable for operating temperature of 2100 degrees Fahr. and having adequate mechanical strength.

In an engine operated by combustion products, the maximum attainable thermal efficiency is limited by the maximum temperature which will be tolerated by the valve which is subjected to the maximum temperature, which is valve 2 in this engine. From the foregoing, it is observed (A) that valve 2, after being contacted by the hot combustion products entering the cylinder during the admission period of approximately fourteen percent of the power stroke, is then cooled by relatively cool compressed air admitted into the valve-chamber 2j by valve 4 and again cooled by the compressed air flowing through the valve from the cylinder; (B) that the valve stem is cooled by water in direct contact with the valve-stem guide of bronze, a good heat conductor; and (C) that cold lubricating oil is pumped directly into contact with the stem of the valve. Thus means are provided for attaining maximum thermal efficiency of the engine.

The mechanism which opens and closes valve 3 in correct relation to the reverse-flow valve, comprises the following parts shown in FIGS. 3, 4, 5 and 6:

Rocker 2h which opens and closes valve 2 is rotatably mounted on stationary rocker-shaft 5, the rocker 2h being integrally joined to a sleeve 3m free to rotate approximately 18 degrees on stationary rocker shaft 5. Sleeve 3m shown in FIGS. 5 and 6, extends along shaft 5 and has integrally joined to it a short crank 3mc in which is tightly secured a pin 3e parallel to shaft 5, as shown in FIGS. 5 and 6. Pin 3e extends beyond crank 3mc and engages the upper end of a toggle 3a, FIGS. 4, 5 and 6. The lower end of the toggle 3a engages the lower end of a crank 3f, FIGS. 4, 5 and 6 mounted on stationary shaft 5, rotatable through approximately 18 degrees. The lower end of crank 3f engages a clevis 3i fastened to the end of a rod 3d having a clevis 3j fastened to its other end engaging a crank 3g fast on the rotatable stem of valve 3, of butterfly type, rotatable through approximately twenty degrees from open to closed position. As shown in FIGS. 3 and 4, a compression spring 3c, concentric around rod 3d, has its right end bearing against a bracket 3br fast to the stationary structure of the cylinder-head. The left hand end of spring 3c bears against a collar fastened to rod 3d. Valve 3 is shown in its half-open position. FIG. 5 shows cam 2f having moved valve 2 also to its half-open position. Compressed air is flowing out of the cylinder through valves 2 and 3. Toggle 3a has its upper and lower links exactly in line, so held by flat spring 3k fastened to crank 3mc and bearing flexibly on the upper end of the toggle link which end is flat horizontally. Thus the toggle is rotating crank 3f counterclockwise opening valve 3. Stationary trip-rod 3be is shown in FIG. 6 as adjusted horizontally with its left end very close to the knee of the toggle 3a. Further counter-clockwise rotation of approximtaely five degrees will trip the toggle releasing its downward counter-clockwise torque on crank 3f and spring 3c will close valve 3, turning crank 3f clockwise, flexing toggle 3a in the position shown by dotted lines, also flexing flat spring 3k. As valve 2 is closed by rocker structure 2h, the toggle will be again straightened and so held by flat spring 3k.

Immediately after the closing of valve 2 ending the admission of combustion products into the cylinder, leaving valve-chamber 2j filled with combustion products, the opening of valve 4, FIG. 4, is started by cam 4f on camshaft 2k, contacting the roller on rocker 4d mounted rotatably on rocker shaft 5, rotating rocker 4d counterclockwise, pushing on the end of rod 4e, rotating crank 4g fast on end of valve stem of valve 4, compressing spring 4h, the right end of the spring bearing against a bracket 4bc fastened to the stationary structure of the cylinder-head. To avoid confusion on FIG. 4 the fastening of bracket 4bc to the stationary structure is not shown, the fastening is shown in FIG. 3. Valve 4 is held open by its cam 4f, passing fresh compressed air from header 4b through valve-chamber 2j, purging it of combustion products remaining in the valve chamber after closing of valve 2, the combustion products being thus pushed back into inlet 2e, valve 3 having closed. The volume of compressed air thus injected by valve 4 will be only equal to the volume of valve chamber 2j (or slightly greater) but well below the volume of inlet 2e, so that no fresh compressed air will be thereby injected into the header 2d, which will contain only combustion products. In order to accomplish such adjustment of volume, passed by valve 4, its cam 4f will have the required profile shape and the angular position of cam 4f on its camshaft will be adjustable.

FIGS. 9 and 10 show a device for counter-balancing the outward thrust on the stem of valve 2 due to the air pressure in valve chamber 2j. With a valve stem of half inch diameter (0.20 square inch) cross sectional area and a pressure of 600 p.s.i.g. in valve chamber 2j, the outward thrust on the valve stem would be 120 lbs. which would require a force of more than 120 lbs. to be exerted by spring 2g, to reclose valve 2 when released by cam 2f. Such a large spring force would be far too great for practical operation. Hence it is necessary to counter-balance the outward thrust. It is also important to provide a reclosing force which will reclose valve 2 as quickly as practical when released by its cam 2f. FIGS. 9 and 10 show a stationary cylinder 2z rigidly secured directly above the upper end of the stem of valve 2, concentric with the stem. In cylinder 2z is a piston 2zg resting on the upper end of the valve stem but not attached to the stem, the piston being free to move up and down by the amount of the valve stem motion. The diameter of cylinder 2z and piston 2zg is larger than the diameter of the valve stem of valve 2, by an amount designed to provide approximately fifty pounds of net reclosing force in addition to that of spring 2g. Assuming a spring force of ten pounds, the total reclosing force will be sixty pounds. To open valve 2 will thus require a force of sixty pounds. With a valve head of 2 inch diameter, approximately 3 sq. inch area and a differential air pressure of 20 lbs. in the cylinder in excess of the pressure in valve chamber 2j, the valve will be opened without the opening force of the cam, which will be favourable condition, minimizing wear on cam and associated parts.

FIGS. 9 and 10 show the cylinder 2z rigidly supported by an angle secured to the upper ends of two rods 2cd, the lower ends of which serve as two of the fastenings of the conical cover 2jb of the valve stem guide assembly shown in FIGS. 3, 4 and 7. Compressed air connection from valve chamber 2j to the cylinder 2z is provided by the tube 2zb. Lubrication of piston in cylinder 2z is provided by oil connection shown supplied from a source of lubricating oil under pressure. Leakage of air past the piston 2zg is minimized by V-shaped rings turned in the piston surface.

Referring to FIGS. 23, 24, 25; water-cooled piston engines operated on combustion products, on a two-stroke cycle, commonly have the exhaust ports through the cylinder-liner and the surrounding cooling water jacket, with solid metal filling the spaces between the adjacent exhaust ports; these spaces, commonly termed "exhaust port bridges," have been the cause of trouble due to poor cooling because the bridge metal has only small surface in contact with the cooling water; the bridge metal overheats and swells, causing "seizing" of the piston. This common condition is well illustrated and described on page 249 in the "Diesel Engineering Handbook" 1950 edition, of the "Diesel Publications Inc." Such trouble is avoided by the arrangement shown in FIGS. 23, 24, 25. The cylinder-liner, of uniform thickness, is the same between the adjacent exhaust ports as elsewhere. Thus the cooling water is in direct contact with the entire surface of the liner, including the "bridge" portion of liner between adjacent exhaust ports; hence there are no parts of the liner at higher temperature than the remainder, and there is no swelling of the metal and no "seizing" of the piston. The conventional arrangements of exhaust ports also have the fault of providing incomplete scavenging due to relatively inadequate discharge capacity to blow all of the spent combustion products out of the cylinder into the exhaust header, only one header being commonly provided. FIGS. 23, 24, 25 show three exhaust ports on each side of the cylinder, discharging into an exhaust header on each side of the cylinder block. Each exhaust port is circular, with well rounded entrances, the three exhaust ports discharging into a single exhaust orifice 1fo flared to the full diameter of the exhaust header and approximately half the height of the cylinder. Each of these two flared orifices is machined to accurately fit the outer cylindrical surface of the cylinder liner and also to accurately fit each of the three exhaust ports through the liner, with suitable conventional gaskets to prevent leakage between the cooling water and exhaust, both at low pressure; these details are shown in FIG. 25 on a larger scale than FIGS. 23 and 24.

The combustor 13 shown in FIGS. 1, 2, 11, 12, 13, 19, 20, 21 and 22 comprises the following members:

A pressure vessel which may be designed for an operating pressure of 600 p.s.i.g., comprising a pressure cylinder 11 of appropriate metal, closed at its upper end by a reducing flange 11a adapted to be bolted to a flanged elbow connected to the entrance end of header 2d; a base casting 12 closing the lower end of the pressure vessel. Concentric within the combustor is the main fuel burner assembly 13. The pressure vessel is lined with heat insulation internally, enclosed in sheet metal such as "Inconel" having an operating temperature capacity of 2100 Fahr. the insulating material having a coefficient of thermal conductivity ("k") sufficient to limit the total loss of heat, including that from the external piping, of less than one percent of the heat input to the engine at full load. The internal heat insulation in the combustor has ample mechanical strength to resist crushing pressure of the combustion products, it is designed to limit the temperature of the pressure vessel wall to a value well within the safe tensile stress of the enclosing cylinder 11. External heat insulation will limit the temperature to a safe value if contacted by operators.

The main burner assembly 13 as indicated in FIG. 1 and shown in detail in FIG. 11, comprises the following principal members: a fuel-vaporizing member 13a of cylindrical shape; a flame-heated member 13b having radial rods 13br which provide additional area of contact with the flame; member 13c of conical shape, integrally joined to 13a and 13b conducts heat from 13b to 13a to maintain vaporizing temperature of 13a. At the lower edge of the vaporizer 13a is an ash ledge 13d integrally joined to 13a. The ash ledge also acts as a fuel vaporizing surface. Members 13a, 13b, 13c and 13d are made of copper plate with the joints welded and all surfaces coated with bronze by spraying on molten aluminum and molten copper in alternating successive layers then heat treated to form a bronze coating integrally bonded to the copper plate, providing a surface which will not oxidize by repeated heating to redness. Extensive experience has shown that such treatment gives satisfactory service. Copper is used on account of its high heat conductivity. The weight of the burner assembly is supported on the base casting 12 with a ring 12a of heat insulation, as shown in FIG. 11.

A vapor screen 13e of thin sheet metal such as "Incoloy," a chrome-nickel alloy, of cylindrical shape, fits tightly the inner edge of the base casting 12 as shown. Compressed air inlet duct 12b is bolted to an inlet opening in casting 12 as shown; this air duct is the one shown in FIG. 1 having the control valve 12b. Fuel oil is fed to the burner by four nozzle assemblies 14 approximately equally spaced around the inside of the cylindrical vapor screen 13e. The actual location of the four nozzle assemblies is shown in FIGS. 12 and 13. The nozzle assembly shown in FIG. 11 is actually located in a vertical plane 45 degrees from the vertical plane shown in FIG. 11. FIGS. 14 and 15 show the nozzle assembly on a larger scale. The nozzle assembly 14 comprises the following members: a nozzle cylinder 14a; a bushing 14g screwed into the end of cylinder 14a; a spray disc 14h bearing against the end surface of the bushing around its entire periphery with an accurate ground fit; the disc 14h has an integral stem 14ha of smaller diameter than the bore through the bushing; the stem is threaded at its end and fitted with a washer and a pair of nuts 14n. Concentric around the stem is a compression spring 14s bearing against the washer and nuts at one end and against the bushing 14g at the other end, thereby exerting a force holding the spray disc 14h tight against the bushing 14g. The nozzle cylinder 14a has a small fuel inlet through its wall on the lower side, to which is tightly connected a fuel tube 14b extending vertically downward, concentric with the nozzle assembly, through the bottom of base casting 12, to the exterior of the combustor where it is connected to the fuel supply. Nozzle head 14a is held down tight on the tubular assembly by two bolts 14x shown in FIG. 11.

In order to use the fuel oils of the lowest grade and price, such as the fuel known as "Bunker C," it is necessary to provide means for heating the oil to a temperature of approximately 180° F. to 220° F. to reduce its viscosity to a free flowing condition. The oil is heated to that temperature in equipment external to the combustor. When starting the combustor and engine from a cold condition, the fuel tube 14b is preheated before admitting the Bunker C oil, in order to avoid chilling the oil in its passage through the tube 14b. Such preheating of tube 14b is accomplished by passing hot water through tube 14c which surrounds tube 14b concentrically. For return of the water a third concentric tube 14d is provided, enclosing the tubes 14c and 14b. The fuel tube 14b has appropriate connections and fittings at its upper and lower ends to prevent leakage of the oil, which must be pumped in at a pressure equal to the operating pressure of the combustor and engine which may be approximately 600 p.s.i.g. plus the pressure required to force the oil out through the spray nozzle.

The outer tube 14d has connections at each end suitable for the pressure of the compressed air in the combustor, approximately 600 p.s.i.g. The lower ends of the water tubes 14c and 14d have packing glands suitable for water pressure which is relatively low. The opening through the bottom of base casting 12 through which the nozzle assembly 14 passes, is made tight against leakage of the compressed air by metal-to-metal fit as shown in FIG. 14, the pair of bolts holding the fitting assembly tight against the ground seat in the base casting 12 opening are shown in FIG. 14. This pair of bolts is not in same plane as the two bolts holding fitting 14f to 14e (FIG. 14). After the burner has been in operation for a considerable time at full capacity, the heat radiated from the vaporizing surface of 13a will maintain the temperature of fuel tube 14b within the range required for free flowing of the Bunker C oil, without the circulation of hot water, which will be automatically stopped. Under some conditions, the temperature of tube 14b may reach a level which would be higher than desirable; under such conditions, the water entering tube 14c would be introduced at a cooling temperature. By such arrangement, the temperature of the Bunker C fuel can be controlled within the safe range of operation.

The fuel oil is pumped into the nozzle 14 by a conventional fuel pump of the positive type delivering the oil at a definite controlled rate independently of the opposing back-pressure in the burner and engine, which may be approximately 600 p.s.i.g., plus the resistance offered by the spray disc 14h pressed against the bushing 14g by the spring 14s by a force which depends on the adjustment of the nuts 14n. For example, if the engine governor controlling the fuel pump calls for a fuel flow of one pound of fuel per minute, that rate of flow will pass through the nozzle, the pump pressure will be whatever is required to force the spray disc 14h open against the force of spring 14s, by a sufficient separation from the bushing face, to pass fuel at the rate of one pound per minute through each nozzle or four pounds per minute through four nozzles. The force which the spring is adjusted to exert will determine, inversely, the thickness of the spray between the disc and the bushing face, the velocity of the spray and the fineness of the so-called "atomization." Oils of all kind, with surface exposed to the atmosphere, absorb a small quantity of air. When pressure is applied to the oil, as by a high pressure pump, there is a compression of the minute quantities of the occluded air which form minute air bubbles, which, though invisible, expand in all directions when the pressure is abruptly released as in issuing from the minute crevice between the spray disc 14h and the bushing face 14g, thus spreading out the flat film of oil into a wide angle, such as 90°, the angle of divergence being proportional to the pressure on the oil. Thus the pattern of the spray of fuel from the circular orifice between the nozzle disc 14h and bushing face 14g, will be approximately hemispherical and distribute the spray of fuel over the entire cylindrical vaporizing surface of member 13a, reaching also portions of the member 13c and ash ledge 13d which are also at vaporizing temperature.

The four fuel nozzles will be operated simultaneously only when the full capacity of the engine is required. For light load and "idling" only one nozzle will be used which will maintain the entire cylindrical surface of member 13a at vaporizing temperature. It will be quite feasible to use light distillate fuel oil instead of the heavy Bunker C oil, when starting the burner and engine from a cold condition, changing automatically to Bunker C after the burner has become sufficiently heated. Also it will be feasible to change from Bunker C to distillate oil just before shutting down the engine and burner for a period long enough for the burner to become cold, thus leaving the nozzle filled with free-flowing distillate oil instead of Bunker C.

With the vaporizing surface 13a at or above vaporizing temperature, all of the combustible constituents of the fuel oil will be vaporized instantly on contacting the hot metal surface. The non-combustible solid constituents, ash, are separated from the vapor and drift down by gravity to the ash ledge 13d, which is also at vaporizing temperature. When operating at maximum capacity of the burner, a small percentage of the liquid fuel spray will reach the surface of the ash ledge 13d and be vaporized. The ash is removed continuously during operation by an ash scraper assembly shown in FIGS. 11 and 12 and in more detail in FIGS. 19, 20 and 21, comprising the following parts: three scraper blades 15 of metal plate such as "Incoloy," equally spaced around the circular ash ledge 13d, each scraper blade 15 being welded to a circular metal ring 15a encircling the outer side of cylindrical screen 13e. Each of the three scraper blades 15 has teeth cut in its lower edge which rests on the ash ledge 13d, bearing the weight of one-third of the scraper ring 15a, which provides continuous contact of each of the three scraper blades against the ash ledge. The upper edge of the circular band 15a has gear teeth cut in its entire periphery, adapted to mesh with and be driven by a spur gear 15h driven by a vertical shaft 15c extending downward through the bottom of base casting 12 to the exterior of the combustor where the shaft is coupled to mechanical means by which it is rotated at a very slow speed such as one revolution per minute, which drives the scraper assembly 15 at approximately one fourth of a revolution per minute. At one point in the ash ledge is a hole 15m of diameter smaller than the width of the ash ledge; this hole is secured in line with a duct 15n extending downward through base casting 12 to the exterior of the combustor to which is connected a pressure vessel adapted to receive and store the ash as it is scraped from the ash ledge and dumped through the hole 15m and duct 15n continuously while in operation. The circular band 15a having gear teeth cut in its upper edge, has attached to the tips of the teeth at several points, preferably by welding, a circular oil spray deflector 15p inclined downward away from the screen 13e. Each of the four nozzle bushings 14g has attached to its lower side, preferably by welding, an oil drip member 14k (FIG. 14) which serves to prevent the trickling of oil downward onto the screen 13e, directing the trickle of oil away from the screen, dropping the oil onto the deflector 15p. The deflector also serves to receive whatever portion of the fuel spray might otherwise fall on the gear teeth and deflect the spray, causing it to drop onto the ash ledge where it will be vaporized. Attached to the vaporizing cylindrical member 13a and located just over the ash discharge opening 15m, is an oil deflector 13f, which serves to deflect liquid fuel from entering the ash discharge opening, deflecting the oil to drip onto the ash ledge where it will be vaporized. Thus only dry ash will enter the ash discharge opening.

The pneumatic downward thrust on the shaft 15c is held by a thrust ball bearing 15d as shown. The upper end of the shaft is held in correct alignment by bearings integral with the gear enclosure 15j fastened to the screen 13e. Packing gland 15e controls leakage of compressed air at the lower end of the shaft. The packing and gland assembly makes a metal-to-metal closure with the ground seat in the bottom of the casting 12, held by two studs as shown. Collar 15f fast to the shaft excludes from the packing any trickle of oil down the shaft. Flexible coupling 15cf provides for any slight misalignment of upper and lower shaft bearings.

When starting the burner from a cold condition it is necessary to first preheat the vaporizing member 13a to vaporizing temperature. This is accomplished by the preheater assembly 17 the position of which is shown in FIGURE 11. FIGS. 16, 17, 18, 26, 27, 28, 29, 30 show the preheater in detail, comprising the following members: a vertical fuel vaporizing chamber 17a concentric with and bolted to a circular opening in the bottom of casting 12. To the lower flanged end of 17a is bolted a blind flange 17b on which is mounted concentrically an electric vaporizing assembly comprising the following members: a fuel inlet tube 17f, joined mechanically and electrically to a pipe-taped hole through the blind flange 17b as shown, adapted for connection to the fuel supply. The upper end of tube 17f is joined to a fuel distributing rod 17d extending downward concentric to 17a, as shown. Fuel distributing rod 17d is enclosed by a fuel diffusing assembly 17c comprising a series of rings of porous material, such as slate, or refractory brick, which also acts as an electric insulator. An electric heating element 17e partly encloses the diffuser assembly throughout its length; the heating element 17e is preferably composed of "Inconel" sheet metal sheared into a zig-zag pattern as in FIG. 18 then rolled to an internal diameter slightly larger than the outside diameter of the slate diffuser assembly as in FIG. 17; "Inconel" being an alloy composed mainly of nickel and chromium, has a high electric resistivity well adapted for this purpose. The heating element 17e is joined electrically at its upper end to the copper contact block 17et contacting cylinder 17a held in such contact by rod 17ab through 17a. The lower end of the heating element is joined electrically to an electric conductor, preferably a copper rod 17g sealed into an electric insulating bushing screwed tight into a tapped hole concentric through the blind flange, the lower external end of the rod 17g being threaded for nuts for connection of an external electric circuit. One terminal of a transformer 17ab is connected to the conductor 17g; the other terminal of the transformer is connected to the metallic structure at the top flange 17t as shown in FIG. 16 which is in electric contact with cylinder 17a and block 17et. Closing the contactor 17sc connects the transformer to the power source and a current of approximately 100 amperes flows through the electric heating element, heating it from a cold condition to red heat in approximately ten seconds. A pipe-tapped hole 17id through the blind flange provides for a pipe connection to drain off excess unvaporized fuel. An air inlet 17h through the wall of the vaporizing chamber 17a near its lower end brings in air for combustion. Additional air for combustion is blown in through tube 17hu. Above the vaporizing assembly is a pair of spark plugs 17sp in the upper part of the vaporizing chamber 17a. A flame tube 17ft of approximately the same diameter as the vaporizing chamber 17a is fitted into the circular opening through the base casting 12, concentric with the chamber 17a, the flame tube extending upward to a level near the upper end of the vapor screen 13e.

The operation of the preheater assembly is initiated by closing the contactor 17sc sending a current through the heating element as just described, heating it to redness in approximately ten seconds; starting the flow of distillate fuel oil upward through tube 17f, downward around rod 17d, outward radially through the crevices between diffuser rings 17c, seeping through the crevices between the rings and soaking into the porous ring material, wetting the outer surface of the slate assembly; the heating element instantly starts vaporization of the film of liquid fuel on the outer surface of the slate diffuser assembly; filling the annular space around the heating element; air flow is started through 17h and 17hu into the vaporizing chamber 17a mixing with the oil vapor; the combustible mixture is carried upward, contacts the spark plugs 17sp and is ignited; the resulting flame, accelerated by the increased temperature and volume of the air, forces the flame upward through the flame tube 17ft and beyond, contacting the heat-receiving assembly 13b, from which the heat is rapidly conducted downward through member 13c and 13a to ash ledge 13d, raising their temperature to vaporizing level in approximately two minutes. Fuel flow is then started through one of the four nozzles 14 and flow of air is started through air inlet 12b into base casting 12, thence upward through annular space surrounding flame tube 17ft. Fuel vapor flows through the perforations in screen 13e, mixes with the upward air flow; the combustible mixture is ignited by the flame issuing from flame tube 17ft, the resulting flame merging with the first flame from flame tube 17ft, contacts the heat-receiving members 13b. After approximately three minutes, the preheater is shut down by stopping flow of current through the electric heating element, stopping flow of fuel into the preheater. Flow of air through the preheater is continued in order to insure that all vapor remaining in the preheater is purged out and burned in the main burner. The spark is stopped after approximately five minutes. The flame from the one fuel nozzle 14 of the main burner provides sufficient heat to maintain the vaporizing members at vaporizing temperature. The other three fuel nozzles are used when full load is required on the engine.

FIG. 13 shows the position of a flame-view glass 14fv which provides a view of the flame in the space occupied by the heat-receiving members 13b; the glass is in the form of a thick plug of Pyrex glass adapted to withstand relatively high temperature; secured in a suitable packing gland to prevent leakage of the compressed air. The flame-view glass 14fv provides visible inspection by the operator of the engine and also means for automatic alarm at a remote location and stopping fuel in-feed in case of failure of the flame.

The diagram of FIG. 1 shows the following valves used only during the starting of the burner and engine from a cold condition:

Check valve 2ab on the right-hand end of header 2a; exhaust valve 2dx solenoid operated, in an extension of header 2d; valves 4bb and 2ba, butterfly type, solenoid operated, closed during starting engine from a cold condition. A manual push-button starts a starting camshaft which turns one revolution in three minutes, then stops itself having completed the starting cycle; the camshaft carries cams and electric contacts which function in the following sequence:

(1) Starts preheater 17 which delivers a preheating flame into the vaporizing burner 13.

(2) At the same time: opens exhaust valve 2dx; starts circulating blower 2b (motor driven); operates solenoids closings valves 4bb and 2ba.

(3) After three minutes, starts flow of bunker C fuel oil into burner 13; at the same time: stops preheater; starts engine turning slowly from a storage battery which starts blower 1d driven from engine crankshaft; releases solenoids which opens valves 4bb and 2ba.

Engine rotation builds up pressure in piping and combustor: check valve 2ab closes automatically by momentary reverse flow. Operator manually controls fuel input gradually raising air pressure and speed of engine; battery starting switch opens by reverse current as current reverses in starting motor, leaving engine running on fuel power. When engine is considered sufficiently warm, fuel input is switched over to control by engine speed governor; and engine is ready for load.

The valvegear construction shown in FIGS. 3, 4, 5, 6, 7, 8 show an important improvement over the design shown in the valvegear FIGS. 1, 4, 9, 10, 5 and 6 of my U.S. Patent No. 2,977,759 of April 4, 1961; the improvement eliminates the solenoid 4bd (FIG. 1) and its shaft 4bc, for tripping the toggle and closing valve 3 on each cylinder; the improvement locates the operating gear for valves 3 and 4 in separate vertical planes, thereby facilitating the separate adjustment of valves 3 and 4. Referring to FIG. 1 in the patent of April 4, 1961, the blower 4ba is eliminated by the arrangement shown in FIG. 1 of the present invention. Referring to FIG. 4 of the aforesaid patent, and FIG. 3 of the present invention, the two camshafts 1k and 2k as shown in FIG. 3, are sectionalized by flanges which are in the vertical planes between the adjacent cylinders of the engine, thereby facilitating removal of the cylinder-head of any cylinder without disturbing adjacent cylinders, for inspection and maintenance work; such arrangement of the two camshafts is made possible by the different arrangement of the valvegear of valves 3 and 4.

FIG. 11 of the existing Patent No. 2,977,759 showing the combustor shows the following features regarding which improvements are shown in the present invention: (A) The secondary air inlet 11j has been found undesirable and has been eliminated; (B) in the heat-exchange cylinder 13b, the radial fins 13bf have been superseded by radial rods 13br riveted into holes in the cylinder 13b, which provides much greater heat-transfer capacity than the fins and are more economical in labor of production; (C) the heat insulation as described in the existing patent, column 5, lines 71 to 75, and column 6, lines 1 to 5, is granular material known as "vermiculite," requiring containers of sheet metal having perforations to permit flow of compressed combustion products in and out of the granular material; a loss in heat insulating efficiency would result from such infiltration; in the present invention the heat insulation is a solid material, known as "insulating concrete" having ample mechanical strength against crushing and requiring no perforations in its sheet metal containers.

FIG. 11 of the existing Patent No. 2,977,759, showing the combustor, includes a view of the preheater required to preheat the combustor when starting from a cold condition. The overall dimensions of the preheater are only about fourteen percent of the overall dimensions of the combustor; hence FIG. 11 could not show all of the many parts of the preheater clearly, in order to do so, separate figures on a larger scale are essential, as shown in FIGS. 16, 17, 18, 26, 27, 28, 29, 30 of the present invention. In the existing Patent No. 2,977,759, the preheater is described in some detail in column 9, lines 21 to 75, and column 10, lines 1 to 44. Extensive research and testing during 1961 and 1962 has resulted in important improvements in preheater design, as shown in the seven figures above enumerated: (A) The fuel inlet tube 17f approximately ¼" diameter, does not conduct the current of approximately 100 amperes which heats the heating element 17e; such a large current would quickly overheat such a small tube unless made of copper which would be quite unsuitable mechanically. In the present invention the heating current, approximately 100 amperes, is conducted through the grounded metal structure of the large cylinder 17a, approximately three inches diameter, thence to the copper block 17et held into firm contact with 17a by its lug 17etl and rod 17ar through 17a; the top terminal of heater 17e being bolted to the block 17et as shown. (B) The fuel distributing "tube" 17d of the existing Patent No. 2,977,759 has been superseded by a solid steel rod 17d, shown in FIGS. 27, 28, 29, 30 having the alternating vertical and horizontal fuel oil passages which are required to distribute the oil uniformly in radial direction to the enclosing fuel diffusing rings 17c; with the perforated tube 17d, the radial flow of oil through the perforations could not be made uniform; being a maximum at bottom and minimum at top of the distributor; the solid rod distributor 17d gives uniform distribution, top to bottom. (C) The tests have shown the sheet metal heating element 17e should be of such design that the entire outer surface of the insulating diffuser rings should be covered by the sheet metal heating element 17e, as nearly as practical, leaving uncovered only sufficient crevices for the escape of the vaporized fuel into the surrounding annular space. In FIG. 11 of the existing Patent No. 2,977,759, although the scale of the drawings is too small to be clear, the uncovered space is apparently about fifty percent of the outer surface of the diffusing rings; tests have shown that unvaporized oil trickles down this surface and is blown upward by the air flow, into the flame, giving unacceptable results. Such defect has been entirely eliminated by the design of 17e shown in FIG. 18 of the present invention. (D) FIG. 11 of the existing Patent No. 2,977,759 shows the preheater having only one inlet for combustion air, being at the bottom; extensive testing has shown that two air inlets are necessary in order to inject air at the rate of 20 pounds of air per pound of fuel oil, which is the minimum air flow for complete oxidation of the fuel; FIG. 16 of the present invention shows a relative small diameter air inlet at the bottom and an inlet of larger diameter at the upper part of the vaporizing assembly; the airflow at the bottom is only sufficient to insure purging of the vapor from the lower portion; heating this airflow externally is advantageous in order to avoid chilling and partly condensing the oil vapor in the preheater. The larger portion of the airflow enters through the upper air inlet; a baffle is shown, to direct the airflow around the vaporizing assembly and upward stopping any flow downward in opposition to the upward airflow from the lower air inlet. The two airflows produce extreme turbulence of the combustible mixture as it contacts the spark, a favorable condition for ignition.

What I claim is:

1. An engine operated by combustion products, said engine having a plurality of identical sections, each section having a cylinder, a piston therein, a crankshaft connected to said piston, a cylinder-head with valves therein, said piston being adapted to move from its head-end to its crank-end and return, a fuel vaporizing combustor of liquid fuel, said combustor being connected by a system of piping to all sections of the engine, each section having air-inlet valves adapted to admit air through said cylinder-head into said cylinder when said piston reaches the crank-end of its motion, exhaust valves through the wall of said cylinder near its crank-end, adapted to discharge said air together with combustion products to atmosphere when said piston uncovers and opens said exhaust valves, said cylinder-head having a two-way valve located in a valve chamber adapted to be closed after admitting the required volume of combustion products from said combustor, said two-way valve remaining closed during the remainder of the power stroke of said piston, said exhaust valves being closed by said piston, the return stroke of the piston to its head-end compressing said air, said air-inlet valves remaining closed during said air compression, said two-way valve being adapted to be opened by the air compressed in said cylinder, discharging said compressed air into said piping system, said piping being adapted to conduct said compressed air to the air-inlet end of said combustor, said combustor being adapted to increase the volume of said compressed air at constant pressure by combustion of said fuel in said compressed air, said increased volume of compressed air with combustion products being conducted through said piping system to all sections of said engine and admitted through said two-way valves to said cylinders driving said pistons in their power strokes, said piping system further comprising a compressed air suction manifold connected to said two-way valves in each section of the engine, an air blower adapted to circulate said compressed air from said suction manifold, blowing said compressed air through said combustor, thence as combustion products through a combustion product manifold through said two-way valves into said cylinders, said air blower having also an auxiliary outlet adapted to deliver compressed air at a pressure slightly higher than the pressure in said combustion products manifold, said auxiliary outlet of said blower being connected to an auxiliary compressed air manifold to which is connected, in each section of the engine, a purging valve adapted to admit compressed air to each of said two-way valve chambers, to purge out the combustion products remaining in said valve chamber after the preceding power stroke of said piston, each two-way valve chamber having connected to its outlet a compressed air stop-valve adapted to remain closed during said purging of said valve chamber, said engine having a camshaft with cams adapted to open each of said valves at the correct instant, said valves being closed by springs, the operating mechanism of each of said purging valves being located in a plane perpendicular to said camshaft, said plane being separated from the plane of the mechanism of said compressed air stop-valve in each section of the engine by ample space to facilitate accurate adjustment of the timing of said valves.

2. An engine according to claim 1, said combustor of liquid fuel having means for vaporizing said liquid fuel, means for mixing said vaporized fuel with said compressed air blown into said vaporizing means of said combustor by said blower, with means for igniting said mixture of fuel vapor and compressed air, said fuel vaporizing means comprising a metal surface heated to fuel vaporizing temperature, means for spraying said liquid fuel against said hot surface, gravity means for separating non-volatile constituents of said liquid fuel from the vapor, ejecting said non-volatile constituents, means for preheating said metallic fuel vaporizing means to fuel vaporizing temperature when starting said engine from a cold condition.

3. An engine according to claim 2, in which said preheater comprises a fuel vaporizing burner adapted to burn fuel having no non-volatile constituents, said burner comprising an upright cylindrical metal vaporizer cylinder adapted to be fastened to the bottom of said fuel vaporizing combustor, with means for projecting the flame of said preheater upward through the center of said combustor, the vaporizing element of said preheater comprising an electrically heated cylindrically formed metallic fuel vaporizer, concentrically located in said preheater cylinder, said electric flat vaporizing element being flexibly mounted on a cylindrical column of rings of refractory material mounted on a solid metal fuel oil distributor rod of substantially the same diameter as the inside diameter of said refractory rings, conduit means for delivering said volatile fuel oil to the top of said fuel distributor rod, said rod having fuel channels cut circumferentially and joined by longitudinal channels in alternating right and left position adapted to deliver said oil by gravity to each of said refractory rings uniformly from top to bottom of said assembly, said oil being thereby directed to flow radially in all directions through the crevices between said flat refractory rings into contact with said electrically heated sheet metal, said sheet metal vaporizer being sheared circumferentially with apertures having width only sufficient for the flow of fuel vapor resulting from contact of oil against said hot sheet metal.

4. An engine according to claim 3, said preheater having means for conducting electric current through said sheet metal fuel vaporizer from top to bottom, comprising a metal contact block fastened to the top end of said sheet metal heater, with means for holding said contact block into contact with the interior of said preheater cylinder, the lower terminal of said sheet metal heater being electrically fastened to a conductor passing downward through an insulating bushing to the outside of said preheater, there connected to one terminal of a source of electric power, the other terminal of said source being fastened to the outer side of said preheater cylinder, the voltage of said electric supply applied to the terminals of said heater being such as to maintain said heater at red heat without injury to said sheet metal, said voltage being obtained from storage battery or from a transformer of suitable ratio.

References Cited by the Examiner

UNITED STATES PATENTS

| 1,704,271 | 3/29 | West | 123—41.83 |
| 1,902,528 | 3/33 | Simmen | 123—41.72 |
| 2,383,626 | 8/45 | Steiner | 123—41.83 |
| 2,688,230 | 9/54 | Milliken | 69—39.63 |
| 2,706,970 | 4/55 | Rinne | 123—41.83 |
| 2,977,759 | 4/61 | Milliken | 60—39.63 |

SAMUEL LEVINE, *Primary Examiner.*